United States Patent [19]
Lin

[11] Patent Number: 5,985,143
[45] Date of Patent: Nov. 16, 1999

[54] STRUCTURE WATER FILTER OUTER SHELL

[76] Inventor: Maw-Chang Lin, 3F.No.123, section 2, Hwanher west Road, Yeng Her, Taipei, Taiwan

[21] Appl. No.: 09/149,237

[22] Filed: Sep. 8, 1998

[51] Int. Cl.[6] .......................... B01D 27/08; B01D 35/30; B01D 35/31

[52] U.S. Cl. .......................... 210/232; 210/238; 210/444; 210/450; 55/502; 55/503

[58] Field of Search ..................................... 210/232, 238, 210/443, 444, 450, 440; 55/508, 505, 502, 503

[56] References Cited

U.S. PATENT DOCUMENTS 3,262,570  7/1966  Gailitis .
3,920,553  11/1975  Cilento .
5,342,519  8/1994  Friedmann .

*Primary Examiner*—Thomas M. Lithgow
*Attorney, Agent, or Firm*—Dougherty & Troxell

[57] ABSTRACT

A water filter outer shell having an improved sleeve and top cover. The top cover and sleeve are formed with interior and exterior conical surfaces, the lower half of the conical surface of the outer shell having exterior threads. The top cover is fastened by screwing interior and exterior threads near the conical surfaces of the top cover and outer shell to eliminate three components from the known device. The tightness and water permeation seal are thus stronger and more effective. The structure has lower production costs to improve market competition.

3 Claims, 3 Drawing Sheets

STRUCTURE WATER FILTER OUTER SHELL

BACKGROUND OF THE INVENTION

This invention relates to an improved structure for a water filter outer shell, specially relating to an improvement that has lower costs of production.

The known water filter outer shell structure consists of a flange position on the exterior wall near the tubular opening conical wall surface with an O-ring seated against the conical surface of the interior wall by a top cover over the upper extend of the outer shell. There is an exterior thread formed along the outer wall of the aforesaid top cover as well as a sleeve that has a matching inner thread and which can be inserted on the outer shell and further screwed onto the top cover. The inner lip at the lower edge of the sleeve tightly secures the top cover to the outer shell as well as produces an interior generated binding force secured outward to the outer shell, increases the internal resistance pressure of the outer shell. This, therefore, reduces the tubular wall thickness of the outer shell and, furthermore, increases the water permeation seal.

SUMMARY OF THE INVENTION

It is an object of this invention to improve the sleeve and top cover as whole, the top cover is having inner threads and inner conical surfaces. The top groove has a circular groove for a seated O-ring and the lower half of the conical surface of the outer shell has exterior threads, which mach the interior threads of the top cover. The top cover is tightly fastened with screwing the interior and exterior threads on the conical surface of outer shell, enabling the removal of three components of the known structures, and increasing the tightness and water permeation seal. The present structure has lower costs of production making it more competitive on the market.

BRIEF DESCRIPTION OF THE DRAWINGS

In order that the invention may be fully understood, it will now be described by way of example, with reference to the accompanying drawings in which like reference numerals or characters represent like parts and where in.

DETAILED DESCRIPTION OF THE PREFERRED EMBODIMENTS

Figure 1:
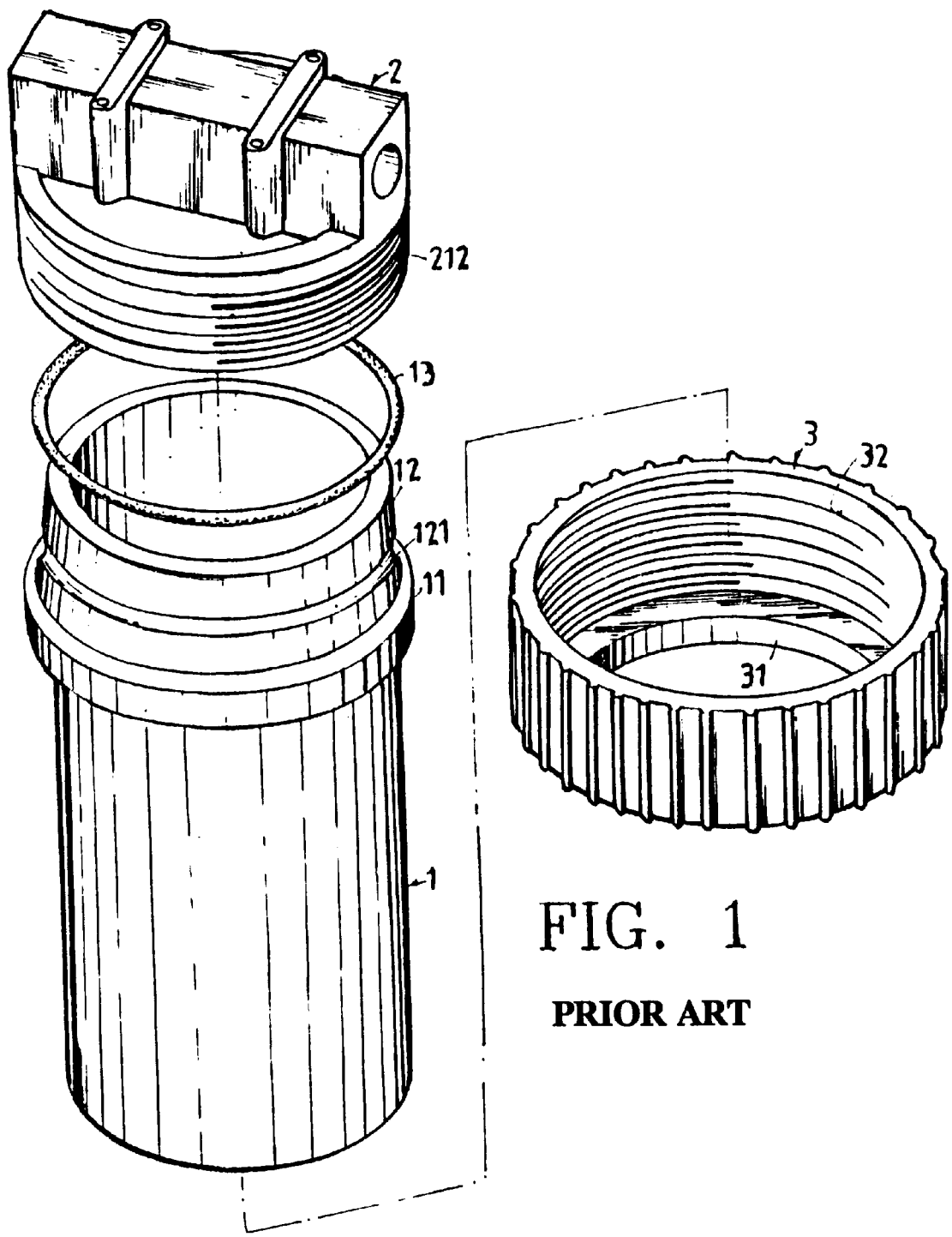
FIG. 1 is an exploded perspective view of a known water filter outer shell.
Figure 2:
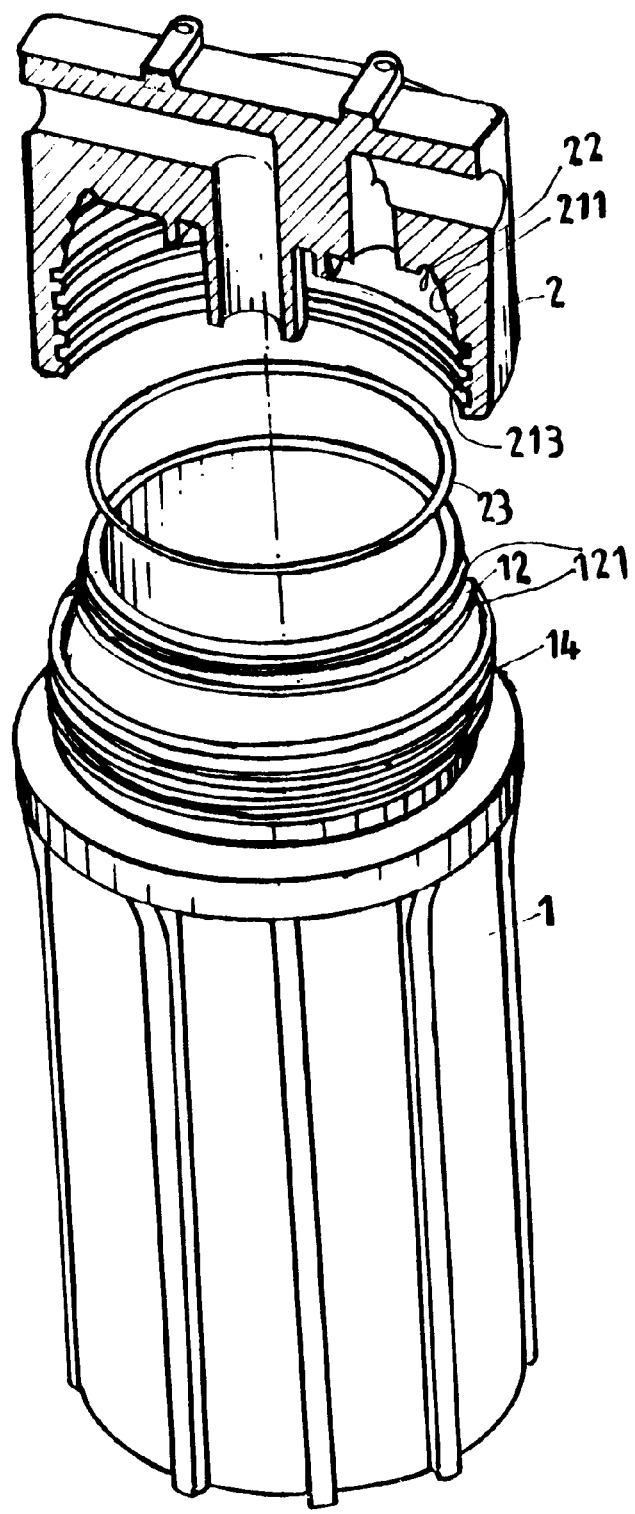
FIG. 2 is an exploded perspective view partially in cross-section of the present invention.
Figure 3:
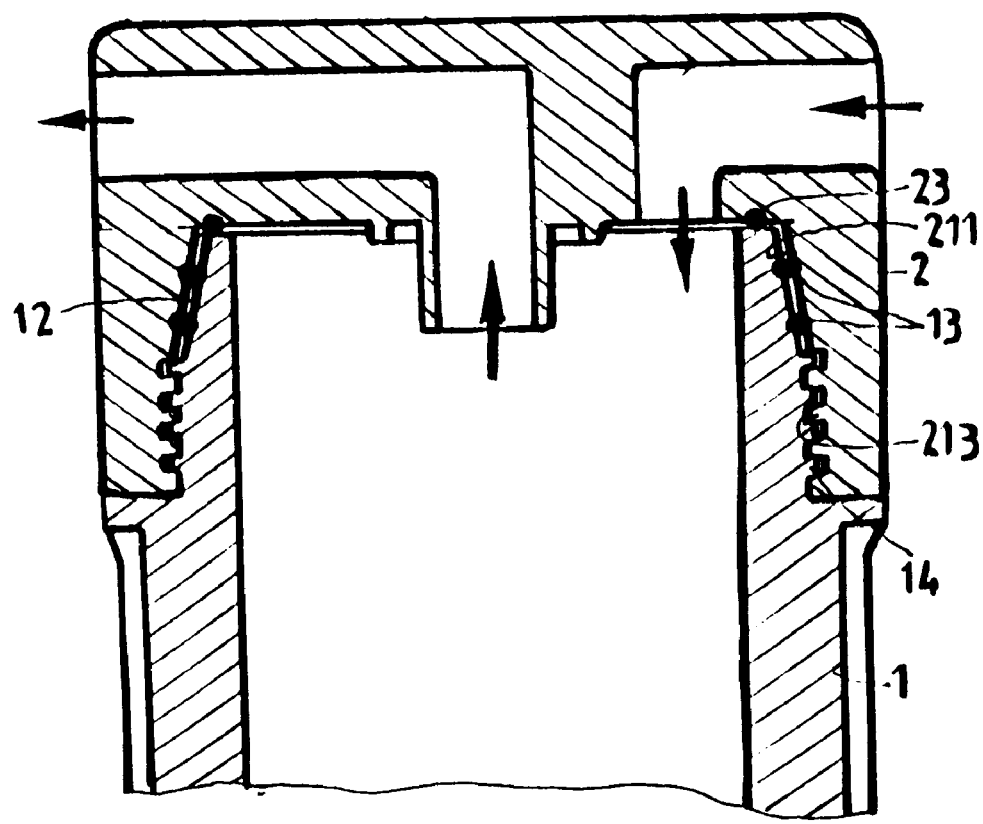
FIG. 3 is a partial cross-sectional view of the present invention.

Referring to FIG. 1, the known structure is comprised of a tube-shaped outer shell (1), a top cover (2), and sleeve, of which the outer shell (1) has a flange (11) formed on and protruding from the exterior wall near the tubular opening. Along the upper extend between wall of the tubular opening is a conical surface (12) having a larger lower portion and smaller upper portion, and formed into the said conical surface (12) at a suitable position is one or two circular grooves (121) that provides for the seating of an O-ring (13). At the upper half of the top cover (2) are the necessary input and output water ports and extending from the lower half is an annular wall having threads (212). The conical surface (12) of the outer shell (11) faces the interior wall of the top cover (2) to enable the top cover (2) to be inserted downward from the top onto the tubular opening of the outer shell (1) which enables the mutual contact of these elements, while also causing the O-ring (13) to be squeezed between the aforesaid elements to form a water permeated seal. The sleeve (3) consists of a ring shaped body that has a lip (31) extending inward from the lower edge and interior threads (32) formed on the interior wall of the aforesaid sleeve (3) that match the exterior threads (212) on the top cover (2). This enables the threaded fastening of the aforesaid sleeve (3) to the aforesaid top cover (2). After the top cover (2) is fastened to the outer shell (1), the sleeve (3) can be inserted upward over the outer shell (1) and be fastened by screwing onto the top cover (2). When the lip (31) inside the sleeve (3) contacts the flange (11) of the outer shell (1), the continuous rotation of the sleeves (3) causes the top cover (2) to tighten downward which causes a tighter degree of contact between the top cover (2) and the conical surface (12) until the lower edge of the top cover (2) is firmly engaged against the flange (11) of the outer shell (1) to produce an optimal water permeation seal. The present invention eliminates the need for the sleeve (3) of the known structures. The top cover of the present invention, in addition to having the necessary input and output water ports and an interior conical surface (211), also has a lower half with interior threads (213). The present invention eliminates the exterior threads (212) on the outer wall of the cover (2). The outer shell (1) is lower and smaller than the known devices and has one or two circular grooves (121) on the conical surface (12) for O-rings (13) to be inserted. Exterior threads (14) are formed on the exterior walls of the lower half of the said conical surface (12) that match the interior threads (213) of the top cover (2). The top cover is secured by engagement of the interior threads (213) of top cover (2) and the exterior threads (14) of the outer shell (1), which causes the tubular opening that is between the top surface of interior and exterior conical surfaces (211, 12) and shell (3) to be tightly closed with the O-rings (13, 23) to form a perfect water permeation seal. Furthermore, the structure has solidity and strength with a simplified structure.

The foregoing description of the present invention has been directed to a particular embodiment thereof for purposes of explanation and illustration; however, it will be apparent to those skilled in this art that many modifications and changes in the embodiment shown may be made without departing from the teachings of the present invention. Accordingly, what subject matter which applicant regards to be his invention is set forth in the following claims.

What is claimed is:

1. An improved structure for a water filter outer shell comprising:

a) an outer shell with at least one open end portion, the at least one open end portion having: a flange extending outwardly therefrom; a truncated conically-configured external surface diminishing in cross-sectional dimension in a longitudinal direction toward an open end of the at least one open end portion the conically-configured surface having at least one O-ring groove formed therein; and external threads located between the conically-configured surface and the flange;

b) an O-ring located in the at least one O-ring groove; and c) a top cover with a fluid inlet and a fluid outlet, the top cover having: a truncated conically-configured internal surface complementary to the truncated conically-configured external surface; and an internally threaded portion, threadingly engaged with the external threads of the outer shell such that the truncated conically-configured internal surface contacts the O-ring.

2. The improved structure for a water filter outer shell of claim 1, further comprising a plurality of O-ring grooves formed in the truncated conically-configured external surface.

3. The improved structure for a water filter outer shell of claim 1, further comprising:
   a) an external end surface on the open end portion of the outer shell;
   b) an internal sealing surface on the top cover, the internal sealing surface being located adjacent to the external end surface when the top cover is threaded onto the outer shell; and
   c) an end O-ring located between and in contact with the external end surface and the internal sealing surface.

* * * * *